3,847,822
ASYMMETRIC MEMBRANE OF POLYVINYL PYR-
ROLIDONE-CELLULOSE ACETATE BLENDS FOR
USE AS HEMODIALYSIS MEMBRANES
Harry F. Shuey, El Monte, Calif., assignor to the United
States of America as represented by the Secretary, De-
partment of Health, Education, and Welfare
No Drawing. Filed May 24, 1972, Ser. No. 256,512
Int. Cl. B01d 13/00, 39/16
U.S. Cl. 210—500                                4 Claims

ABSTRACT OF THE DISCLOSURE

Hemodialysis membranes formed of polyvinyl pyrroli-
done-cellulose acetate blends are disclosed. The mem-
branes were found to have high inulin permeation values
while almost completely reflecting albumin.

BACKGROUND OF THE INVENTION

This invention relates to hemodialysis membranes and
more particularly this invention relates to a polyvinyl
pyrrolidone-cellulose acetate blend.

Although regenerated cellulose membranes are widely
used in hemodialysis, many workers in the field of dialy-
sis assert that improved membranes are needed. There is
general agreement that increased transport of blood solutes
would be advantageous, but more particularly, many prac-
titioners believe that increased transport of solutes with
molecular weights less than albumin but greater than that
of uric acid or creatinine could result in improved con-
trol of the uremic syndrome. In addition, such dialysis
membranes should be nonthrombogenic.

Cellulose acetate membranes of the asymmetric or
"active layer" type have been prepared for this purpose.
These membranes are characterized by a very thin, dense
"active layer" surmounting a relatively thick layer hav-
ing an open-cell sponge-like structure with borders of
about 0.5 micron diameter. Such a membrane has been
used for desalination by reverse osmosis. In dialysis, how-
ever, unlike reverse osmosis, it was recognized that the
porous substructure could impede the transport of solutes
by concentration polarization in the dialysate solution fill-
ing its pores. If, on the other hand, the pores allowed cir-
culation of fluid, increased transport rates could be real-
ized due to the extreme thinness of the active layer. Sev-
eral methods for controlling the permeability or porosity
of the active layer of cellulose acetate membranes were
discovered during the course of studies of the structure
and transport properties of the same. These methods in-
volve variations in the composition of the casting solu-
tion and various modifications of the membrane fabrica-
tion procedure. Additionally, studies have been conducted
towards the preparation of membranes which are non-
thrombogenic or can be made nonthrombogenic by the
surface binding of heparin.

Accordingly, it is a primary object of the present inven-
tion to provide a hemodialysis membrane having improved
permeability and thrombogenic properties.

It is another object of the present invention to provide
a hemodialysis membrane which can be easily and cheaply
fabricated.

It is still another object of the present invention to pro-
vide a hemodialysis membrane which comprises a blend
of cellulose acetate and polyvinyl pyrrolidone.

Before describing the instant invention in detail, how-
ever, a brief discussion of the various testing methods and
standards used is in order. The most commonly used
membrane for hemodialysis is made of Cuprophan, which
is a reconstituted cellulose made by the cuprammonium
process. This membrane is used herein as the standard
for comparison.

It is noteworthy that membranes prepared from cellu-
lose acetate and other cellulose acetate derivatives have
had mass transfer coefficients equivalent to or higher than
Cuprophan in spite of the fact that they were three to
five times as thick. Mass transfer coefficients, $h_o$, are
measured with a parallel-plate dialysis cell of the Babb-
Grimsrud design. (Lars Grimsrud, "A Theoretical and
Experimental Investigation of the Performance of a Par-
allel-Plate Dialyzer in the Laminar Flow Regime, with
Applications to Hemodialyzer Design," PhD thesis, Uni-
versity of Washington, 1965; A. L. Babb, C. J. Maurer,
D. L. Fry, R. P. Popovich, and R. E. McKee, "The De-
termination of Membrane Permeabilities and Solute Dif-
fusivities with Applications to Hemodialysis," *Chem. Eng.
Progr. Symposium Serial No. 84, 64, 59* (1968).)

The method used by Grimsrud for the calculation of
the mass transfer coefficient, $h_o$, makes use of the math-
ematical expression $$h_o = \frac{Q}{A} \ln \frac{c_i}{c_o},  \quad \text{Eq. 1}$$

where Q is the volume rate of flow of feed solution, A is
the area of membrane, $c_i$ is the concentration of solute
in the feed into the cell, and $c_o$ is the concentration of
solute in the feed coming out of the cell. This expression
although apparently satisfactory for the evaluation of
Cuprophan, is not applicable to the more open mem-
branes prepared according to the present invention. The
difficulty is that the formula does not take into account
changes in feedwater volume which occur on passage
through the Babb-Grimsrud cell when it contains a mem-
brane with a very high water transport rate. In initial
data, the volume of feed remained unchanged with Cupro-
phan, decreased with the cellulose acetate membrane, and
increased with a cellulose acetate derivative membrane.
Therefore, different values for $h_o$ are obtained from Eq.
1 depending on whether $Q_i$ or $Q_o$ is used, where $Q_i$ and
$Q_o$ refer to the volume rate of flow of feed solution into
and out of the cell, respectively, and $\Delta Q$ is the rate of
volume lost by ultrafiltration or gained by osmosis.

In order to provide for changes in feed volume, Eq. 1
was replaced by the following expression based on heat-
transfer theory $$h_o' = \frac{1}{A} \frac{Q_i c_i - Q_o c_o}{c_i - c_o} \ln \frac{c_i}{c_o} \quad \text{Eq. 2}$$

Using this modified treatment of the data, it was still ob-
served that membranes with very high water-transport
properties exhibit what appear to be anomalous varia-
tions in mass transfer coefficient ($h_o'$) with changes in
dialysate flow rates in the Babb-Grimsrud test cell. This
phenomenon is exemplified in the following table for the
transport of sodium chloride at 25° C. through cellulose
acetate and cellulose acetate derivative membranes.

TABLE 1

| Membrane | Dialysate flow rate, ml./min. | $h_o'$ (NaCl), cm./mins (×10⁴) |
|---|---|---|
| Cellulose acetate | 500 | 455 |
|  | 100 | 229 |
| Cellulose acetate derivative | 500 | 269 |
|  | 100 | 244 |

In the case of the cellulose acetate membrane, reduc-
tion of the dialysate (deionized water) flow rate resulted
in a 48% decrease in $h_o'$. The same reduction in dialysate
flow rate resulted in only a 10% decrease in $h_o'$ in the
case of the cellulose acetate derivative.

A dialysis cell developed by the National Bureau of
Standards specifically for use in the evaluation of hemo-
dialysis membranes was also used in the testing program.
(O. B. Lang and D. P. Stokesberry. *The Development of*

Standard Test Methods for Hemodialysis Membranes, National Bureau of Standards Report No. 9872, July 30, 1968). The relationship specified for the calculation of solute permeability from data obtained from tests using the NBS cell is as follows:

$$P = \frac{V_b V_d}{V_b + V_d} \times \frac{1}{A_t} \ln \frac{(C_b - C_d)_o}{(C_b - C_d)_t} \qquad \text{Eq. 3}$$

where,

P=the permeability of the membrane in cm./min.,
$V_b$ and $V_d$=the fluid volumes on each side of the membrane of 500 ml. each,
A=the exposed area of the membrane of 51.6 cm.$^2$,
$t$=the time interval between the initial and final readings in minutes,
$(C_b - C_d)_o$=the initial concentration difference, and
$(C_b - C_d)_t$=the final concentration difference.

It must be noted for the NBS cell as well as for the Babb-Grimsrud cell that when evaluating the more permeable membranes it is difficult to fully interpret the experimental data. These difficulties arise due to the high transport of water by osmotic flow, and of water and solutes by ultrafiltration.

It is believed that the changes in mass transport and permeability values in going from high to low dialysate flow rates in the Babb-Grimsrud dialysis cell can be accounted for by calculated changes in the ultrafiltration rate as a result of the difference in pressure across the membrane in the dialysis cell. Consequently, a change in ΔP will cause a relatively small change in solute transfer for membranes which exhibit a low ultrafiltration rate. With membranes having high ultrafiltration rates, however, a change in ΔP will result in a large change in solute transport. This assumption should be easy to confirm by studies using the NBS cell where ΔP through the membrane may be varied while maintaining constant flow rates on the two membrane surfaces. It appears that in certain cellulose acetate derivative membranes transport of solutes by a diffusive mechanism is more important than in cellulose acetate membranes. In the latter, transport by ultrafiltration or pore flow seems to be the predominant mechanism.

As is well known, certain of the common materials used for dialysis membranes, while having good dialysis properties, tend to be incompatible with blood and to cause clotting. One suggestion to overcome this problem is to chemically modify cellulose acetate with potentially nonthrombogenic groups. The approach taken according to the present invention, however, is to blend cellulose acetate wtih another polymer which either possesses nonthrombogenic properties or can be modified to do so. This modification would take the form of bonding heparin to the polymer.

According to the present invention, a membrane is cast containing a blend of cellulose acetate and polyvinyl pyrrolidone. Polyvinyl pyrrolidone is a stable water-soluble polymer that physiologically resembles plasma protein. It was originally used as a blood expander during World War II and since then a variety of pharmaceutical and cosmetic applications have been developed. Recently, one investigator obtained a Lee-White clotting time of 105 minutes on a heparinized polyvinyl pyrrolidone (5%) acrylamide (18%) hydrogel, and an unheparinized clotting time of 47 minutes. Another investigator prepared a film of polyvinyl pyrrolidone cross-linked with 10% diisocyanate that dialyzed urea more than three times as fast as cellophane. The cross-linking was utilized to insolubilize the water-soluble polyvinyl pyrrolidone. From this previous work, it would be expected that a cellulose acetate-polyvinyl pyrrolidone blend would be slowly soluble. However, it has been recently reported than an ethyl cellulose-polyvinyl pyrrolidone blend from which a film was prepared was completely insoluble in both gastric and intestinal fluids.

A number of membrane characteristics are important to their application in hemodialysis and, therefore, are evaluated either directly or indirectly. The mass transport of solutes by dialysis and of water by ultrafiltration are, of course, important. For reliability as well as ease of assembly, the membranes must also exhibit satisfactory tensile strength and sufficient elongation to conform to seals without rupture.

Since solutes and water are transported through the membrane by ultrafiltration as well as by diffusion, ultrafiltration cells were used for the preliminary evalution of all membranes. In these cells the feed solution, under pressure, is circulated across the active layer of the membrane and a portion of the water and of the solutes permeate the membrane. The ratio of the concentration of a solute in the permeate to its concentration in the feed gives a measure of the porosity of the membrane, and the rate of permeate flow is the ultrafiltration rate. The ultrafiltration cells used on the current program expose 29.4 sq. cm. of a circular membrane having a diameter of three inches to the feed solution at a pressure of one atmosphere.

The ultrafiltration test has proven to be a rapid method of comparing the ultrafiltration rates of membranes for hemodialysis. It has also been useful for the detection of membranes of excessive porosity, i.e., membranes which transport albumin. The ultrafiltration rates are reported as ml./min.-m.$^2$-min. Hg ($\times 10^2$). A solute permeation (SP) expressed as a percentage is used to denote the ratio of the concentration of a solute in the permeate to its concentration in the feed solution.

The studies are conducted with a solution containing about 8,500 p.p.m. of sodium chloride, and 150 p.p.m. of inulin in a 0.01 M phosphate buffer (310 p.p.m. phosphorous). The phosphate buffer, prepared from a mixture of mono- and disodium phosphates, is included to maintain the feed solution without a pH range of 7.2 to 7.4. The standard test solution for the ultra-filtration cell is prepared by the addition of 1000 p.p.m. of albumin to the above solution. The dialysis and transport of other solutes, especially those metabolites characteristic of the uremic syndrome, should be considered. Guanidinosuccinic acid is of special interest in this respect.

Modifications of known colorimetric procedures are currently used for all analyses. Sodium chloride concentrations are determined by the use of mercuric chloroanilate as an exchange reactor for ionic chloride (*Clinical Methods Manual for Spectronic 20*, Bausch and Lomb, 1965), inulin by reaction with anthrone (E. E. Morse, "Anthrone in Estimating Low Concentrations of Sucrose," *Analytical Chemistry*, 19, 1012 (1947)), and albumin by the well-known biuret reaction (*Clinical Methods Manual for Spectronic 20*, Bausch and Lomb, 1965)), or by the turbidity produced by reaction with trichloroacetic acid (*Clinical Methods Manual for Spectronic 20*, Bausch and Lomb, 1965), both of which appear in the Bausch and Lomb manual.

The permeation characteristics of asymmetric membranes may often be correlated with their physical properties because both depend on membrane structure. Also, a compromise must be reached between the permeation characteristics and the mechanical properties in the preparation of the optimum dialysis membrane.

The membranes are cast using procedures which are well-known in the art. The blend of cellulose acetate and polyvinyl pyrrolidone is dissolved in any solvent system which is compatible for dissolving both polymers. By "solvent system" is meant any single solvent or combination of solvents which meet the requirements of compatibility. Exemplary of such a solvent is 1-methyl-2-pyrrolidone and a typical representative solvent system containing more than one ingredient is a mixture of acetone and glacial acetic acid. The solution could also include a small proportion of water in order to impart certain characteristics to the drying of the solution, as long as the proportion of water used does not cause gelling or "blushing." Other characteristics of solvents may be utilized such as the difference in volatility or hydrophobicity. If a more volatile solvent is used, the rate of solvent loss during the limited drying time can be utilized to achieve the same effect as an extended drying time. On the other hand, a more hydrophobic solvent, compatible with the polymers, could be used which does not retard the loss of organic solvent but does retard the diffusion of water into the membrane during gelation. This should also effectively increase the polymer concentration in the liquid casting solution formulation just prior to and during gelation. Additionally, other characteristics which can be easily determined by one of ordinary skill in the art can be adjusted by casting membranes from polymers of different molecular weights. In general, polymers falling within a wide range of molecular weights can be used, the only limitation being that they be of a molecular weight which can be cast into a film by the ordinary procedures, and exhibit the desirable dialysis and ultrafiltration characteristics such as retaining albumin which has a molecular weight of approximately 60,000 while showing high transport rate for solutes of low molecular weight.

The casting solution is made by dissolving the blend of polyvinyl pyrrolidone and cellulose acetate in sufficient solvent system to reduce the viscosity of the casting solution so that it can be easily handled. Generally, this will fall into a range of about 200 to about 500 parts of solvent per 100 parts of polymer blend. The membranes are prepared by casting a film of the solution on glass at ambient temperature. The film is cast to a thickness of about 8 mils and gelled in ice water. A short drying time, up to about 60 seconds, could be used, but in the preferred method the film is immediately gelled without any drying time.

The film cast on the glass is allowed to set in the ice water for a time sufficient to allow the same to soak loose from the glass plate. This time could range from about 10 to 20 minutes. The membrane is then tested using the aforementioned procedures.

An asymmetric membrane was prepared from a polyvinyl pyrrolidone-cellulose acetate blend according to the foregoing procedure using a casting solution formulation containing polyvinyl pyrrolidone 360 (Mann Research Laboratory), cellulose acetate E–400–25 (Eastman Kodak), acetone and glacial acetic acid in 2,8,40 and 5 parts by weight, respectively. Films of 8 mils thickness were cast on a flat glass plate at room temperature (25° C.) and immediately gelled in ice water. A 2.76 mil thick membrane prepared as described was evaluated under conditions of ultrafiltration at 25° C. and 14.7 p.s.i.g. using a feed solution consisting of 150 p.p.m. inulin (molecular weight of about 5,000) and 1,000 p.p.m. human albumin (molecular weight of about 67,000) in buffered saline solution. The buffered saline solution contained 8500 p.p.m. sodium chloride in 0.01 M phosphate buffer of pH 7.2. The hydraulic permeability and permeation were determined and compared with typical values for Cuprophan.

TABLE 2

| | Cuprophan | Polyvinyl pyrrolidone-cellulose acetate |
|---|---|---|
| Thickness, mils | 0.9–1.0 | 2.76 |
| Hydraulic permeability, ml./min.-m.²-mm. Hg ($\times 10^2$) | 2–4 | 14.9 |
| Inulin permeation, percent | 11–15 | 83 |
| Albumin permeation, percent | 0–0.6 | 0.2 |
| Burst pressure, p.s.i.g | 7–9 | 9.6 |

As can be seen, compared to Cuprophan, the membranes according to the present invention exhibited an inulin permeation value of from about 5.5 to 7.5 times higher and an ultrafiltration rate of about 4 to 7.5 times that of Cuprophan while being equally effective in reflecting albumin.

It should be apparent from the foregoing detailed description that the objects set forth hereinabove have been successfully achieved. Moreover, while there is shown and described a present preferred embodiment of the invention, it is to be distinctly understood that the invention is not limited thereto but may be otherwise variably embodied and practiced within the scope of the following claims.

What is claimed is:

1. An asymmetric hemodialysis membrane comprising a homogeneous mixture of polyvinyl pyrrolidone and cellulose acetate, said membrane being permeable to inulin and essentially impermeable to albumin.

2. A membrane as defined in claim 1, wherein said polyvinyl pyrrolidone and said cellulose acetate are present in a ratio of about 1 to 4.

3. A membrane as defined in claim 1, having a thickness of from about 1.4 to about 3.0 mils.

4. A membrane as defined in claim 3, having a thickness of between about 2 and about 3 mils.

References Cited

UNITED STATES PATENTS

| 2,593,540 | 4/1952 | Cornwell et al. | 210—22 |
| 3,556,305 | 1/1971 | Shorr | 210—490 |
| 3,483,282 | 12/1969 | Manjikian | 106—176 X |

FRANK A. SPEAR, JR., Primary Examiner